(12) United States Patent
Yuan et al.

(10) Patent No.: US 8,048,550 B2
(45) Date of Patent: Nov. 1, 2011

(54) FLUOROELASTOMER GASKET COMPOSITIONS

(75) Inventors: Hui Liang Yuan, LaGrange, GA (US); Yingjie Kong, Canton, MI (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 752 days.

(21) Appl. No.: 12/029,097

(22) Filed: Feb. 11, 2008

(65) Prior Publication Data

US 2008/0193826 A1 Aug. 14, 2008

Related U.S. Application Data

(62) Division of application No. 10/783,302, filed on Feb. 18, 2004, now Pat. No. 7,344,796.

(51) Int. Cl.
*H01M 2/08* (2006.01)

(52) U.S. Cl. .......... 429/35; 524/495; 524/500; 524/544; 524/545; 524/779

(58) Field of Classification Search .............. 429/35; 524/495, 500, 544, 545, 779
See application file for complete search history.

(56) References Cited

U.S. PATENT DOCUMENTS

| | | | |
|---|---|---|---|
| 3,837,657 A | 9/1974 | Farnam et al. | |
| 3,935,050 A | 1/1976 | Conger et al. | |
| 3,939,892 A | 2/1976 | Farnam et al. | |
| 4,070,219 A | 1/1978 | Farnam | |
| 4,098,945 A | 7/1978 | Oehmke | |
| 4,169,185 A | 9/1979 | Bhatia | |
| 4,421,878 A * | 12/1983 | Close .......................... | 523/454 |
| 4,500,353 A | 2/1985 | Maszalec | |
| 4,582,537 A | 4/1986 | Maszalec | |
| 4,799,695 A | 1/1989 | Yoshino | |
| 4,993,723 A | 2/1991 | Sroka et al. | |
| 5,041,472 A | 8/1991 | Myer | |
| 5,082,725 A | 1/1992 | Saito et al. | |
| 5,209,967 A | 5/1993 | Wright et al. | |
| 5,215,315 A | 6/1993 | Belter | |
| 5,238,621 A | 8/1993 | Hagen et al. | |
| 5,248,428 A | 9/1993 | Hagen et al. | |
| 5,328,756 A | 7/1994 | Wright et al. | |
| 5,383,567 A | 1/1995 | Sorathia et al. | |
| 5,433,167 A | 7/1995 | Furukawa et al. | |
| 5,451,625 A | 9/1995 | Fukushi | |
| 5,629,361 A | 5/1997 | Nakabayashi et al. | |

(Continued)

FOREIGN PATENT DOCUMENTS

EP 0422960 A2 4/1991

(Continued)

OTHER PUBLICATIONS

"Expancel Technical Bulletin No. 7," Expancel, Inc. (Akzo Nobel), Sep. 25, 2000, 4 pgs.

(Continued)

*Primary Examiner* — Peter D. Mulcahy
*Assistant Examiner* — Henry Hu
(74) *Attorney, Agent, or Firm* — Ronald W. Wangerow; Harness, Dickey & Pierce, P.L.C.

(57) ABSTRACT

A gasket elastomer precursor of admixed fluoroelastomer particulate, curing agent, and metallic oxide reduction-agent optionally admixed with any of microspheres, inert particulate, PTFE particles. In one embodiment, the composition is applied to a substrate and cured to provide a fuel cell gasket. The admixtures provide a basis for designed cured admixtures having internally differentiated regions interbonded by cured elastomer.

20 Claims, 2 Drawing Sheets

U.S. PATENT DOCUMENTS

| | | | |
|---|---|---|---|
| 5,629,364 A | 5/1997 | Malmbom et al. | |
| 5,650,671 A | 7/1997 | Pascucci et al. | |
| 5,658,671 A | 8/1997 | Fukushi | |
| 5,738,936 A | 4/1998 | Hanrahan | |
| 5,904,978 A | 5/1999 | Hanrahan et al. | |
| 5,925,837 A | 7/1999 | Ju et al. | |
| 6,057,054 A * | 5/2000 | Barton et al. | 429/483 |
| 6,093,763 A | 7/2000 | Clarke | |
| 6,255,581 B1 | 7/2001 | Reis et al. | |
| 6,291,576 B1 * | 9/2001 | Schmiegel | 524/544 |
| 6,349,945 B1 | 2/2002 | Schmucker et al. | |
| 6,410,630 B1 * | 6/2002 | Hoover et al. | 524/365 |
| 6,423,439 B1 * | 7/2002 | Barton et al. | 429/509 |
| 6,426,159 B1 * | 7/2002 | Kralick | 429/434 |
| 6,517,084 B2 | 2/2003 | Inamura | |
| 6,575,473 B2 | 6/2003 | Sugimoto et al. | |
| 6,593,381 B2 | 7/2003 | Whinnery, Jr. | |
| 6,624,251 B1 | 9/2003 | Chmielewski | |
| 6,739,183 B1 | 5/2004 | Kestly | |
| 2003/0144400 A1 * | 7/2003 | Osen et al. | 524/432 |
| 2005/0181260 A1 * | 8/2005 | Cai et al. | 429/35 |
| 2005/0187324 A1 | 8/2005 | Yuan et al. | |
| 2005/0187331 A1 | 8/2005 | Yuan et al. | |

FOREIGN PATENT DOCUMENTS

WO    WO-2004/008565 A2    1/2004

OTHER PUBLICATIONS

"Specification sheet for Expancel DU," Expancel, Inc. (Akzo Nobel), 2002, 1 pg.

"Specification sheet for Maglite D," The C.P. Hall Company, Dec. 2002, 1 pg.

"Specification sheet for Maglite Y," The C.P. Hall Company, 2000, 1 pg.

* cited by examiner

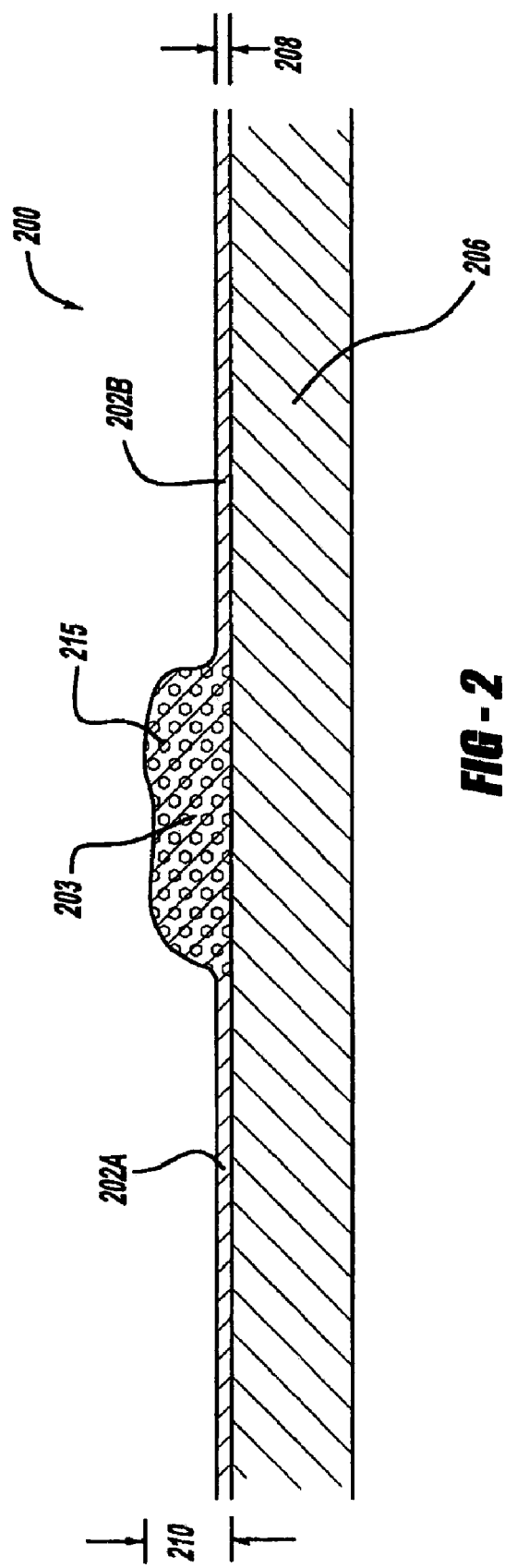

FLUOROELASTOMER GASKET COMPOSITIONS

CROSS-REFERENCE TO RELATED APPLICATIONS

This application is a divisional of U.S. application Ser. No. 10/782,302 filed Feb. 18, 2004, issued on Mar. 18, 2008 U.S. Pat. No. 7,344,796.

INTRODUCTION

This invention relates to gasket compositions. In particular, the present invention relates to compositions comprising certain elastomers for forming gaskets that may be useable in applications including fuel cells.

Gaskets provide a seal between two mating components. Typically, the two components have respective (essentially coplanar or flat) mating surfaces essentially adjacently disposed except for the intervening gasket. In this regard and in the absence of the gasket, the mating surfaces frequently do not press together ideally without some voids being created between the two surfaces, and these voids can establish undesired leakage pathways between the two components. The gasket compensates for this by providing a reasonably flexible interface to fill any voids between the surfaces and also, in many cases, to provide a compressed mechanical spring between the two mating surfaces. Bolts or similar fasteners compressively connect (mate) the two components together and compress the gasket (to form a compressed spring seal) between the mating surfaces.

Fuel cell power systems convert a fuel and an oxidant to electricity. One fuel cell power system type of keen interest employs use of a proton exchange membrane (hereinafter "PEM") to catalytically facilitate reaction of fuels (such as hydrogen) and oxidants (such as air/oxygen) into electricity. The PEM is a solid polymer electrolyte that facilitates transfer of protons from the anode to the cathode in each individual fuel cell of the stack of fuel cells normally deployed in a fuel cell power system.

In a typical fuel cell stack, individual fuel cells have bipolar flow field plates providing channels for the various reactant and cooling fluids reacted in the fuel cell stack to flow into each cell. Gas diffusion assemblies (plate-form) then provide a final fluid conduit to further disperse reactant fluids from the flow field space to the reactive anode and cathode in a plate-form membrane assembly. Gaskets provide sealing and electrical insulation between the various plates of a fuel cell stack.

While many gaskets are made of several different pieces stacked in a multilayer orientation, minimization of the number of parts needed for any assembly is an ongoing goal. Single piece gaskets are therefore desirable. Many gaskets require seals applied as coatings rather than as separate gasket-form layers. Such coatings need to be removed when the fuel cell is disassembled, and these operations can take time.

An improved gasket is needed to provide a long-term robust interface for sealing fuel cells where no coating is needed to hold the gasket to any plates of the fuel cell and where the gasket can be periodically removed and then easily reused in reassembly of the fuel cell.

SUMMARY

The invention provides a gasket composition comprising:
(a) fluoroelastomer particulate derived from vinylidenefluoride, hexafluoropropene, and tetrafluoroethylene, where the fluoroelastomer has a Mooney viscosity from about 25 to about 75, fluorine from about 65 to about 69 atomic weight percent, at least 90 weight percent fluoroterpolymer, and halogenated crosslink sites;
(b) inert particulate from about 10 to about 50 parts per 100 parts by weight of the fluoroelastomer particulate, where the inert particulate has a particle size less than about 250 mesh;
(c) curing agent from about 0.5 to about 20 parts per 100 parts by weight of the fluoroelastomer particulate, where the curing agent crosslinks the fluoroelastomer particulate to generate cured fluoroelastomer and hydrogen ions; and
(d) magnesium oxide reduction-agent particulate from about 5 to about 50 parts per 100 parts by weight of said fluoroelastomer particulate, said metallic oxide reduction-agent particulate having particle sizes less than about 250 mesh, said magnesium oxide having a BET (Brunauer, Emmett, and Teller method) surface area from about 40 to about 70 square meters per gram.

In further aspects of the invention, the gasket composition additionally comprises such materials as microspheres and PTFE particulates. The present invention also provides single component gaskets comprising the compositions of this invention.

It has been found that the compositions of this invention afford advantages over gasket compositions among those known in the art, including one or more of excellent conformability, good high temperature robustness, excellent resistance to electrolytic and moisture attack, low permeation rate, strength with resiliency, abrasion resistance, solvent resistance, good tensile and elongation properties, reduced cost, and good adhesion to metals, graphite, composites, and other materials having a high surface tension.

Further areas of applicability will become apparent from the detailed description provided hereinafter. It should be understood that the detailed description and specific examples, while indicating embodiments of the invention, are intended for purposes of illustration only and are not intended to limit the scope of the invention.

BRIEF DESCRIPTION OF THE DRAWINGS

The present invention will become more fully understood from the detailed description and the accompanying drawings of FIGS. 1 and 2.

FIG. 2 shows a simplified partial cross-sectional view of a gasket carrier section with a cured admixture of having a microsphere enhanced region, two other regions of cured admixture without microsphere enhancement, and a continuous elastomer phase.

Figure 1:
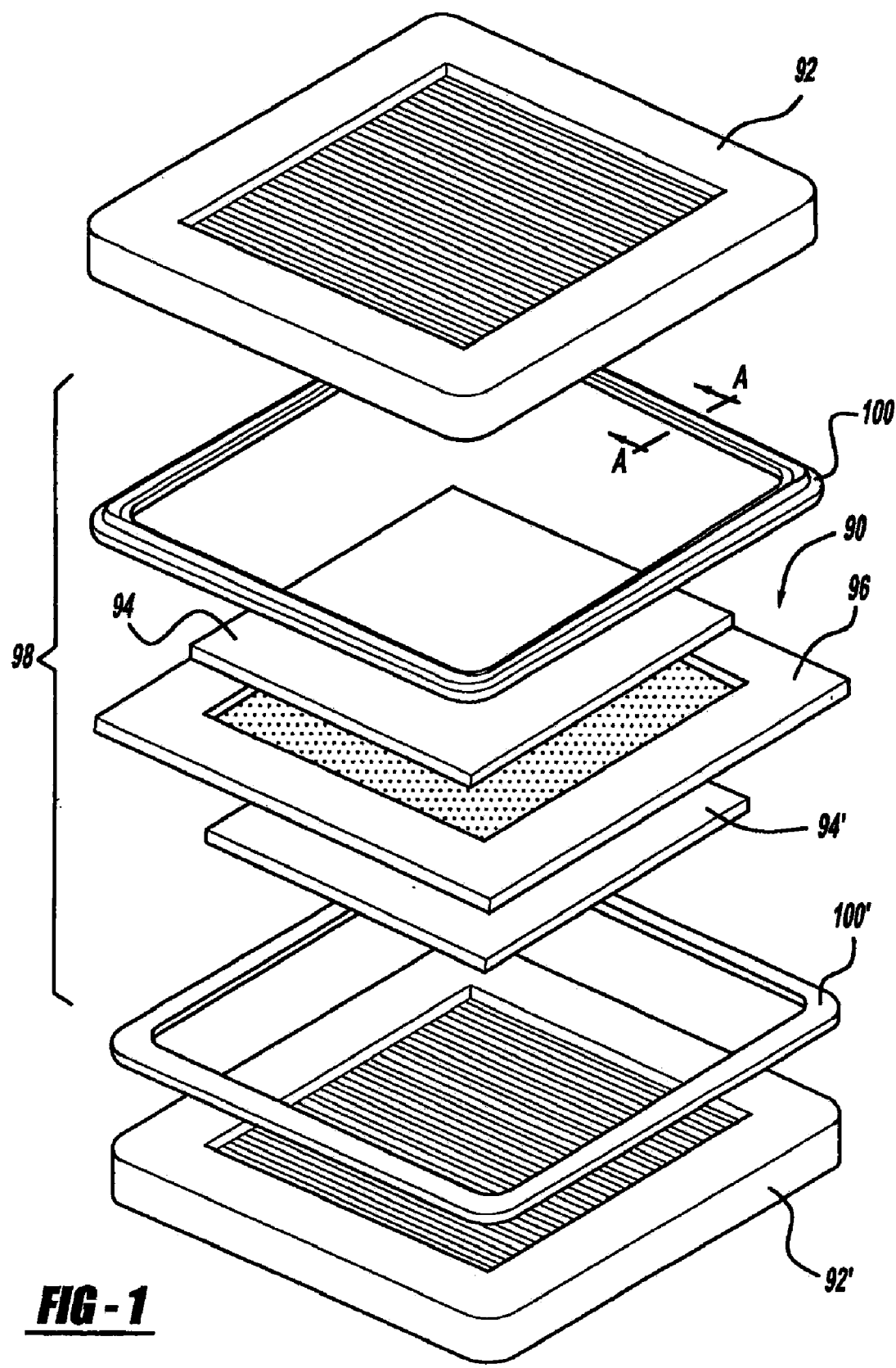
FIG. 1 depicts a portion of a fuel cell assembly.

It should be noted that the figures set forth herein are intended to exemplify the general characteristics of an apparatus, materials and methods among those of this invention, for the purpose of the description of such embodiments herein. These figures may not precisely reflect the characteristics of any given embodiment, and are not necessarily intended to define or limit specific embodiments within the scope of this invention.

DESCRIPTION

In use, a gasket represents an intersection of considerations in both mechanical design and in materials design. In this regard, improvements in materials frequently are intertwined with improvements in mechanical design. When a component, such as a gasket, is made of a basic material coated with at least one additional material, the process of joining the materials together is also of interest. The following discussion will begin with a focus on some new materials, shift in focus to a consideration of mechanical design considerations benefiting from the new materials, and then focus on process considerations related to the production of the new materials and their use.

The following definitions and non-limiting guidelines must be considered in reviewing the description of this invention set forth herein.

The headings (such as "Introduction" and "Summary") used herein are intended only for general organization of topics within the disclosure of the invention, and are not intended to limit the disclosure of the invention or any aspect thereof. In particular, subject matter disclosed in the "Introduction" may include aspects of technology within the scope of the invention, and may not constitute a recitation of prior art. Subject matter disclosed in the "Summary" is not an exhaustive or complete disclosure of the entire scope of the invention or any embodiments thereof.

The citation of references herein does not constitute an admission that those references are prior art or have any relevance to the patentability of the invention disclosed herein. All references cited in the Description section of this specification are hereby incorporated by reference in their entirety.

The description and specific examples, while indicating embodiments of the invention, are intended for purposes of illustration only and are not intended to limit the scope of the invention. Moreover, recitation of multiple embodiments having stated features is not intended to exclude other embodiments having additional features, or other embodiments incorporating different combinations the stated of features.

As used herein, the words "preferred" and "preferably" refer to embodiments of the invention that afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the invention.

As used herein, the word "include," and its variants, is intended to be non-limiting, such that recitation of items in a list is not to the exclusion of other like items that may also be useful in the materials, compositions, devices, and methods of this invention.

The present invention provides a gasket material, comprising a fluoroelastomer particulate derived from vinylidene-fluoride, hexafluoropropene, and tetrafluoroethylene. In one embodiment, the fluoroelastomer has a Mooney viscosity from about 25 to about 75, fluorine from about 65 to about 69 atomic weight percent, at least 90 weight percent fluoroterpolymer, and halogenated crosslink sites. In one embodiment, Viton™ B-600 (E. I. du Pont de Nemours & Co.) provides base elastomer particulate for the admixture. Depending upon the eventual time needed to dissolve the elastomer particulate into a solvent, the size of the elastomer particulate varies from a small granule to a small fragmentary chip of a couple of centimeters in length and/or width.

Inert particulate in a quantity (concentration) from about 10 to about 50 parts per 100 parts by weight of the fluoroelastomer particulate is also dispersed throughout the base elastomer particulate of the gasket admixture. The inert particulate has particle size less than about 250 mesh (that is, a particle size which will pass through a screen of about 250 mesh). Particulates useful herein include those selected from the group consisting of calcium carbonate, carbon black, graphite, fumed silica (silica fume), and kaolin, and combinations thereof. In one embodiment, inert particulates are added to the composition for controlling properties such as creep, conformability, bonding strength, and pencil hardness in the composition after it has been cured (crosslinked). In one embodiment, carbon black is added to provide for a pencil hardness of greater than 3H (ASTM D-3363 "Standard Test Method For Film Hardness By Pencil Test") in a gasket seal after the gasket has cured.

The composition also comprises a curing agent at a concentration from about 0.5 to about 20 parts per 100 parts by weight of the fluoroelastomer particulate. In this regard, the curing agent accelerates crosslinking of the fluoroelastomer as the admixture cures to provide a continuous elastomer phase and also to release hydrogen ions into the curing admixture. In one embodiment, the composition comprises an amine curing agent providing a —C=N— group. In this regard, N,N'-dicinnamylidene-1,6-hexane is an especially preferred curing agent for bonding fluoroelastomer with fluorinated crosslinking sites where the cured elastomer will be used in high temperature applications. In some embodiments, hexamethylene diamine carbamate or ethylene diamine carbamate are amines functioning as the curing agent. Mixtures of any of N,N'-dicinnamylidene-1,6-hexane, hexamethylene diamine carbamate and ethylene diamine carbamate are used in yet other embodiments.

The composition also comprises metallic oxide particulate in a concentration from about 5 to about 50 parts per 100 parts by weight of the fluoroelastomer, where the metallic oxide will not be detrimental to fuel cell operation. The metallic oxide particulate preferably has a particle size less than about 250 mesh, and is preferably in the admixture in sufficient quantity to combine with hydrogen ions (generated by the curing agent during curing of the admixture) while also being controlled in quantity and activity so that the crosslinking process will provide a cured coating having a bonding strength appropriate for desired gasket operating conditions. In this regard, the BET surface area of the metallic oxide particulate is from about 40 to about 70 $m^2/g$. A preferred metallic oxide particulate for fuel cell gaskets is MgO. In one embodiment, MgO having a BET surface area from about 40 to about 70 $m^2/g$ has a low enough activity that fuel cell operation will not be detrimentally impacted by residual MgO in the gasket after curing. An example of MgO particulate is Maglite™ Y (a moderately active magnesium oxide having a BET surface area from about 40 to about 70 $m^2/g$ for fluoroelastomer curing) made by The C.P. Hall Company of Chicago, Ill.

With further respect to the activity level of the metallic oxide reducing agent, in certain embodiments a "diminished activity" metallic oxide reducing agent (having a BET surface area from about 40 to about 70 $m^2/g$) provides utility in curing thin fluoroelastomer coatings (for example, without limitation, coatings applied as films having a thickness of less than about 200 microns) where hydrogen ions are generated during curing. In certain embodiments, the limited activity reduction agent maintains a sufficient hydrogen ion concentration in the curing elastomer such that the rate of crosslinking executes at a pace more aligned with diffusive migration of condensation products (such as, for example HF generated during the crosslinking) from the film than would be the case if a "high activity" reducing agent were to be used and the hydrogen ion concentration was thereby kept to a very low concentration. In certain embodiments, the paced crosslinking promoted by metallic oxide reducing agent with a BET surface area from about 40 to about 70 $m^2/g$ thereby enables "long" chains of fluoroelastomer polymer to be crosslinked within the elastomer as compared to the situation which is believed to occur with high activity reducing agents where a "lower" hydrogen ion concentration during crosslinking effectively drives the equilibrium conditions in the crosslinking reaction to sustain rapid crosslinking and promotes thereby a large number of "short" polymer chains. The long elastomer chains facilitated with metallic oxide reducing agent with a BET surface area from about 40 to about 70 m$^2$/g enable a very adherent bond to substrates to which the coating is applied.

In one embodiment, the composition comprises metallic oxide particulates with an amine curing agent such as N,N'-dicinnamylidene-1,6-hexane. In one embodiment, the metallic oxide particulate is achieved with MgO in from about 1 to about 30 parts per 100 parts by weight of the fluoroelastomer particulate. In one embodiment where N,N'-dicinnamylidene-1,6-hexane is in about 8 parts per 100 parts by weight of the fluoroelastomer particulate, MgO is in about 20 parts per 100 parts by weight of the fluoroelastomer particulate.

In one embodiment, the composition comprises polytetrafluorinated ethylene (PTFE) particulates, preferably at a level of up to about 75 parts per 100 parts by weight of the fluoroelastomer particulate. The polytetrafluorinated ethylene particulate preferably has a mean particle size from about 10 to about 50 microns. The PTFE particles are preferably dispersed within the continuous cured fluoroelastomer, so that at least a two phase polymeric material is provided. The PTFE particles help to reduce wear on the gasket from engine vibration, and they also augment release of the gasket during engine disassembly.

The compositions optionally comprise expandable microspheres, preferably having a mean particle size from about 0.5 to about 20 microns and preferably at a concentration of from about 0.5 to about 20 parts per 100 parts by weight of the fluoroelastomer particulate. The microspheres have shells comprising a polymer selected from the group consisting of any of polyvinyl chloride, polyvinylidene chloride, copolymers of polyvinyl chloride and polyvinylidene chloride, and combinations thereof. The microspheres respectively expand during curing to provide expanded microspheres in the cured material.

The compositions optionally comprise microspheres preferably having a mean particle size from about 20 to about 120 microns and preferably at a concentration of from about 0.5 to about 20 parts per 100 parts by weight of the fluoroelastomer particulate. The microspheres have shells of any of polymer, ceramic, glass, and combinations thereof. These microspheres do not expand during curing.

The microspheres establish dispersed and sealed gaseous phases within the continuous cured fluoroelastomer, so that a foamed polymeric material is provided. In this regard, localized regions of the gasket can be engineered to have a foam attribute, and a designed gasket is therefore enabled with differentiated regions interbonded with a continuous elastomer phase. In such embodiments, the microspheres thereby enable degrees of freedom (in concentration, size, and microsphere compositional specifics) for balancing properties related to flexibility, conformability, resiliency, and toughness in the cured gasket.

Wax particulate of from about 0.05 parts to about 5 parts per 100 parts by weight of the fluoroelastomer particulate is used in some embodiments to improve flow properties in mixing the admixture into a solvent for application to a substrate (such as metal or graphite) and to enhance particulate intermixing during mechanical agitation of the admixture. Examples of wax particulate include paraffin, carnaubra wax, polypropylene wax and combinations thereof.

In one embodiment, the composition is fluidized with solvent sufficient to provide an admixture viscosity from about 10,000 centipoises to about 500,000 centipoises. The solvent is preferably selected from the group consisting of ketones, alcohols, ester solvents, and combinations thereof. Preferred solvents include those selected from the group consisting of methyl isobutyl ketone, ethyl acetate, cellosolve acetate, sorbitol acetate, 3,5,5-trimethyl-cyclohexene-1-one, cyclohexenone, butyl cellulose acetate, methanol, ethanol, isopropyl alcohol, and mixtures thereof. In one embodiment, the solvent comprises a mixture of about 20 weight percent 3,5,5-trimethyl-cyclohexene-1-one, about 20 weight percent cyclohexenone, and about 60 weight percent butyl cellulose acetate.

In one embodiment, the present invention provides a gasket composition comprising:

(a) fluoroelastomer particulate derived from vinylidenefluoride, hexafluoropropene, and tetrafluoroethylene, where the fluoroelastomer has a Mooney viscosity from about 25 to about 75, fluorine from about 65 to about 69 atomic weight percent, at least 90 weight percent fluoroterpolymer, and fluorinated crosslink sites;

(b) carbon black (having particles sized less than about 250 mesh) at a level of from about 10 to about 50 parts per 100 parts by weight of the fluoroelastomer particulate;

(c) polytetrafluorinated ethylene particulate (having a mean particle size from about 10 to about 50 microns) at a level of less than about 75 parts per 100 parts by weight of the fluoroelastomer particulate;

(d) N,N'-dicinnamylidene-1,6-hexane at a level of from about 0.5 to about 20 parts per 100 parts by weight of the fluoroelastomer particulate;

(e) magnesium oxide reduction-agent particulate from about 5 to about 50 parts per 100 parts by weight of said fluoroelastomer particulate, said metallic oxide reduction-agent particulate having particle sizes less than about 250 mesh, said magnesium oxide having a BET surface area from about 40 to about 70 square meters per gram;

(f) wax particulate at a level of from about 0.05 parts to about 5 parts per 100 parts by weight of the fluoroelastomer particulate; and (g) solvent sufficient to provide an admixture viscosity from about 10,000 centipoises to about 500,000 centipoises, where the solvent is a blend of about 20 weight percent 3,5,5-trimethyl-cyclohexene-1-one, about 20 weight percent cyclohexenone, and about 60 weight percent butyl cellulose acetate.

In some embodiments, carbon black is present in about 35 parts, polytetrafluorinated ethylene particulate in about 5 parts, n,n'-dicinnamylidene-1,6-hexene in about 8 parts, and MgO in about 10 parts (all per 100 parts by weight of the fluoroelastomer particulate). In some of these embodiments, pre-expanded microspheres of between about 20 and 120 microns or expandable microspheres of from about 0.5 to about 20 microns in a concentration of about 8 parts per 100 parts by weight of the fluoroelastomer particulate are also present.

Turning now to the Figures and to mechanical design opportunities and considerations affiliated with the new fluoroelastomer particulate gasket admixtures, FIGS. 1 and 2 illustrate various embodiments of a gasket according to the present invention. Referring initially to FIG. 1, fuel cell 90 consists of a first flow field plate 92 and a second flow field plate 92', a first gas diffusion layer 94 and a second gas diffusion layer 94', and a proton exchange membrane 96. Diffusion layers 94 and 94' in one embodiment also conduct electricity and, when pressed against polymer membrane 96, form a membrane electrode assembly or MEA. To seal fuel cell 90, two elastic gaskets 100 and 100' are required. Those skilled in the art will recognize that gasket 100 and gasket 100' are essentially identical and the prime numerals used to describe the gasket 100' are the same elements used to describe the gasket 100. Similarly, first gas diffusion layer 94 is essentially identical to the second gas diffusion layer 94' and first flow field plate 92 is essentially identical to second flow field plate 92'.

First gas diffusion layer 94 is placed one side of the ion exchange polymer membrane 96. First flow field plate 92 is placed against static gasket 100 and the second flow field plate 92' is placed against static gasket 100' to form a single fuel cell 90.

In operation, fluids that are either gas or liquid are separately supplied on one side and the other side of subassembly 98 through passages, channels or openings in flow field plates 92, and 92' as is convention. One fluid (hydrogen) flows through the upper side of subassembly 98 through the first flow field plate 92 to the anode side of proton exchange membrane 96 where the platinum catalyst promotes the separation of the fluid into protons and electrons. On the opposite lower side of subassembly 98, a second fluid (oxygen) flows through the second flow field plate 92' to the cathode side of proton exchange membrane 96 where the second gas diffusion layer 94' attaches protons from the first side of subassembly 98. The electrons are captured as useful electrical energy though an external circuit (not shown). Gaskets 100 and 100' prevent the migration of the fluids out of subassembly 98.

Examples of materials for resilient sealing gaskets 100 and 100' in the illustrated example include cured fluoroelastomers having optional microspheres as previously discussed. Gaskets 100 and 100' are formed in a variety of different ways, such as by (in example) screen printing, direct coating, or even decal transfer.

In one embodiment, the present invention provides gaskets of a composition of this invention having differentiated regions. In this regard, in one embodiment, a first gasket region without admixed microspheres is derived from a first admixture of the crosslinkable elastomer and a second gasket region with dispersed microspheres is derived from a second admixture of the crosslinkable elastomer. In one such embodiment, the amount of microspheres (for instance, at least 5 parts per hundred parts of crosslinkable elastomer) in the second region enable the second region to be "foamed" and yet smoothly interbonded with the first gasket region with the cured continuous elastomer phase. The cured continuous elastomer phase (interbonding the first region and the second region) is derived from simultaneous curing of the crosslinkable elastomer in both regions. In this way, microspheres enable "foam in place" regions within an otherwise non-foamed gasket, so that a designed gasket material is enabled. At low loading points, the conformable foamed region facilitates an excellent seal; and, when complementarily positioned at high load points, the non-foamed regions of the coating minimize crush and load loss derived from creep and relaxation in the compressed gasket. The non-foamed region also functions as a load stopper for the foamed portion when the load is substantial. In another beneficial aspect, the foam region can be positioned to level and distribute the load on the gasket and thereby minimize undesirable crushing of other regions of the gasket (such as, for example, beaded portions).

In further example of this, FIG. 2 shows a simplified partial cross section 200 at A-A of FIG. 1, but (to enable convenient focus on a particular gasket design feature used in conjunction with the fluoroelastomer gaskets described herein) on a general carrier 206 that is generally flat and non-contoured. A first fluoroelastomer admixture with few microspheres is disposed onto carrier 206 at regions 202a and 202b. A second fluoroelastomer admixture having essentially the same fluoroelastomer particulate base as the first admixture, but with a large number of microspheres (see microsphere 215), is disposed onto carrier 206 at region 203. After curing, region 203 provides a resilient portion in the gasket of raised thickness 210 as compared to thickness 208 of cured admixture at regions 202a and 202b.

In one embodiment, the concentration of microspheres in the composition of gasket region 203 is dependent upon the particular spring force desired when gasket 200 is used. In this regard, when compressively interfaced to a second surface, interface regions 202a and 202b are, in one embodiment, positioned at locations for compressively interfacing the sealing surface of gasket embodiment 200 to a second surface (pressing against the upper surface of gasket 200 from above gasket 200). In such a compressive situation, the interfacing surface of region 203 compressively interfaces to the second surface via coplanar mechanical compression derived from the compressive force exerted by fasteners and also from inherent rigidity in the two mating components. As gasket 200 is compressed, an internal resistive force equivalent to the compressive force will exist in compressed gasket 200 (the opposing force exerted by a classic spring to a compressing force) at each point on gasket 200. Under the presumption that the localized internal resistive (spring) force within gasket 200 needs to be greatest at region 203, the relative quantity of dispersed micro-spheres in region 203 is that which provides, upon expansion of the micro-spheres and curing of the admixture, a thickness 210 which will be sufficiently greater than thickness 208 to provide the desired localized internal resistive force maximum at region 203.

It is to be noted that the first and second fluoroelastomer admixtures of gasket 200 form, during curing, a crosslinked elastomer continuum among and throughout, respectively, regions 202a, 203, and 202b. This enhances strength and flexibility in the overall conjoined admixtures to provide macroproperties in the gasket seal which benefit from the regionally differentiated properties respective to the compositionally differentiated regions.

Turning now to process considerations related to the production of the new materials and their use, fluoroelastomer particulate, inert particulate, metallic oxide reduction-agent particulate, wax, and, optionally, PTFE particulate and/or microspheres as previously described herein are admixed and conveyed to a mixer, such as a Banbury mixer, for mixing into pliable agglomerate. In one embodiment, the agglomerate is then fragmented into about 1 gram macro particulate. The macro particulate is then dissolved into an appropriate solvent (previously described herein) to form a stored admixture elastomer precursor solution having a desired viscosity. The selected curing agent (in one embodiment in alcohol solution) is admixed into the elastomer precursor solution shortly before use (preferably within 48 hours) to make the admixture elastomer precursor for application to a forming substrate.

The stored admixture elastomer precursor is applied, in one embodiment of a process for using the gasket admixture, to an essentially flat surface of a carrier (for example, a carrier for a gasket). The carrier is then optionally further formed for final use. In a second embodiment, a carrier is first formed to not have a universally-flat surface of interest for a gasket (a carrier having a non-planar admixture application surface); and the elastomer precursor is then applied to the non-planar surface. When the surface to be coated is graphite, then the elastomer precursor is deposited on the graphite without benefit of a primer.

After the elastomer precursor has been applied to the carrier, the carrier and admixture are heated to from about 380° F. to about 415° F. as needed to expand any microspheres and to cure the elastomer precursor.

EXAMPLE

Viton™ B FKM polymer is used to prepare gasket samples for a bipolar plate in a fuel cell. The composition is listed as below. A Banbury mixer is used to combine the following ingredients. The agglomerate is then blended by a mill into the sheet form compound and then cut into about 1g chunks. A coating is prepared by dissolving and mixing the pieces into butyl cellulose acetate solvent by the weight ratio of 3:5 (solids vs. solvent). N,N'-dicinnamylidene-1,6-hexane curing agent is mixed in at a weight ratio of 1:23 over the above polymer solution just before applying the coating. A viscosity is measured on the final coating at around 100,000 centipoises by Brookfield viscometer. Screen printing is used to apply the coating selectively onto a graphite substrate to make a gasket for a fuel cell. The screen printed part then is dried and cured, at 90° C. and 390° C. respectively, each for 15 minutes.

The coating is used for sealing and for electrical insulation. Testing shows that the FKM coating seals air under 10 lb/in$^2$ load and provides sufficient insulation function with a 150 micrometer thick cured film.

| | |
|---|---|
| FKM terpolymer (Viton ™ B) | 100 parts |
| Carbon Black MT990 | 30 |
| MgO (Maglite ™ Y) | 10 |
| Wax | 1.2 |
| PTFE | 50 |

The examples and other embodiments described herein are exemplary and not intended to be limiting in describing the full scope of compositions and methods of this invention. Equivalent changes, modifications and variations of specific embodiments, materials, compositions and methods may be made within the scope of the present invention, with substantially similar results.

What is claimed is:
1. A fuel cell, comprising:
   (a) a bipolar plate;
   (b) a membrane electrode assembly; and
   (c) a gasket interposed between said plate and said assembly, said gasket cured from an admixture comprising:
      (1) fluoroelastomer particulate derived from vinylidenefluoride, hexafluoropropene, and tetrafluoroethylene, said fluoroelastomer having: (i) a Mooney viscosity from about 25 to about 75, (ii) fluorine from about 65 to about 69 atomic weight percent, (iii) at least 90 weight percent fluoroterpolymer, and (iv) halogenated crosslink sites;
      (2) inert particulate from about 10 to about 50 parts per 100 parts by weight of said fluoroelastomer particulate, said inert particulate having particle sizes less than about 250 mesh;
      (3) curing agent from about 0.5 to about 20 parts per 100 parts by weight of said fluoroelastomer particulate, wherein said curing agent crosslinks said fluoroelastomer particulate to generate cured fluoroelastomer and hydrogen ions; and
      (4) magnesium oxide particulate from about 5 to about 50 parts per 100 parts by weight of said fluoroelastomer particulate, said magnesium oxide particulate having particle sizes less than about 250 mesh, and having a BET surface area from about 40 to about 70 square meters per gram.

2. A fuel cell according to claim 1 wherein said admixture further comprises polytetrafluorinated ethylene particulate of less than about 75 parts per 100 parts by weight of said fluoroelastomer particulate, said polytetrafluorinated ethylene particulate having a mean particle size from about 10 to about 50 microns.

3. A fuel cell according to claim 1 wherein said admixture further comprises microspheres present in an amount from about 0.5 to about 20 parts per 100 parts by weight of said fluoroelastomer particulate.

4. A fuel cell according to claim 1 wherein said admixture further comprises a wax particulate present in an amount from about 0.05 parts to about 5 parts per 100 parts by weight of said fluoroelastomer particulate.

5. A fuel cell according to claim 1 wherein said inert particulate is selected from the group consisting of calcium carbonate, carbon black, graphite, fumed silica, and kaolin and mixtures thereof.

6. A fuel cell according to claim 1 wherein said curing agent comprises an amine.

7. A fuel cell according to claim 6 wherein said amine curing agent is selected from the group consisting of N,N'-dicinnamylidene-1,6-hexane, hexamethylene diamine carbamate, ethylene diamine carbamate, and combinations thereof.

8. A fuel cell according to claim 1 wherein said magnesium oxide particulate is present in an amount from about 1 to about 30 parts per 100 parts by weight of said fluoroelastomer particulate.

9. A fuel cell according to claim 1 wherein said admixture further comprises solvent sufficient to provide an admixture viscosity from about 10,000 centipoises to about 500,000 centipoises.

10. A fuel cell according to claim 9 wherein said solvent comprises a ketone, alcohol, or ester solvent or a mixture thereof.

11. A fuel cell according to claim 10 wherein said solvent is selected from the group consisting of methyl isobutyl ketone, ethyl acetate, cellosolve acetate, sorbitol acetate, 3,5, 5-trimethyl-cyclohexene-1-one, cyclohexenone, butyl cellulose acetate, ethanol, methanol, isopropanol, or a mixture thereof.

12. A fuel cell according to claim 11 wherein said solvent comprises a blend of about 20 weight percent 3,5,5-trimethyl-cyclohexene-1-one, about 20 weight percent cyclohexenone, and a cellosolve acetate.

13. A fuel cell, comprising:
   (a) a bipolar plate;
   (b) a membrane electrode assembly; and
   (c) a gasket interposed between said plate and said assembly, said gasket cured from an admixture comprising:
      (1) fluoroelastomer particulate derived from vinylidenefluoride, hexafluoropropene, and tetrafluoroethylene, said fluoroelastomer having: (i) a Mooney viscosity from about 25 to about 75, (ii) fluorine from about 65 to about 69 atomic weight percent, (iii) at least 90 weight percent fluoroterpolymer, and (iv) halogenated crosslink sites;

(2) inert particulate from about 10 to about 50 parts per 100 parts by weight of said fluoroelastomer particulate, said inert particulate having particle sizes less than about 250 mesh;

(3) curing agent from about 0.5 to about 20 parts per 100 parts by weight of said fluoroelastomer particulate, wherein said curing agent crosslinks said fluoroelastomer particulate to generate cured fluoroelastomer and hydrogen ions;

(4) magnesium oxide particulate from about 5 to about 50 parts per 100 parts by weight of said fluoroelastomer particulate, said magnesium oxide particulate having particle sizes less than about 250 mesh, and having a BET surface area from about 40 to about 70 square meters per gram; and (5) a solvent comprising a blend of about 20 weight percent 3,5,5-trimethyl-cyclohexene-1-one, about 20 weight percent cyclohexenone, and a cellosolve acetate sufficient to provide an admixture viscosity from about 10,000 centipoises to about 500,000 centipoises.

14. A fuel cell according to claim 13 wherein said admixture further comprises polytetrafluorinated ethylene particulate of less than about 75 parts per 100 parts by weight of said fluoroelastomer particulate, said polytetrafluorinated ethylene particulate having a mean particle size from about 10 to about 50 microns.

15. A fuel cell according to claim 13 wherein said admixture further comprises microspheres present in an amount from about 0.5 to about 20 parts per 100 parts by weight of said fluoroelastomer particulate.

16. A fuel cell according to claim 13 wherein said admixture further comprises a wax particulate present in an amount from about 0.05 parts to about 5 parts per 100 parts by weight of said fluoroelastomer particulate.

17. A fuel cell according to claim 13 wherein said inert particulate is selected from the group consisting of calcium carbonate, carbon black, graphite, fumed silica, kaolin, and mixtures thereof.

18. A fuel cell according to claim 13 wherein said curing agent comprises an amine.

19. A fuel cell according to claim 13 wherein said amine curing agent is selected from the group consisting of N,N'-dicinnamylidene-1,6-hexane, hexamethylene diamine carbamate, ethylene diamine carbamate, and combinations thereof.

20. A fuel cell according to claim 13 wherein said magnesium oxide particulate is present in an amount from about 1 to about 30 parts per 100 parts by weight of said fluoroelastomer particulate.

* * * * *